No. 677,535. Patented July 2, 1901.
J. BURRY.
TELEGRAPH APPARATUS.
(Application filed Nov. 20, 1899.)
(No Model.)
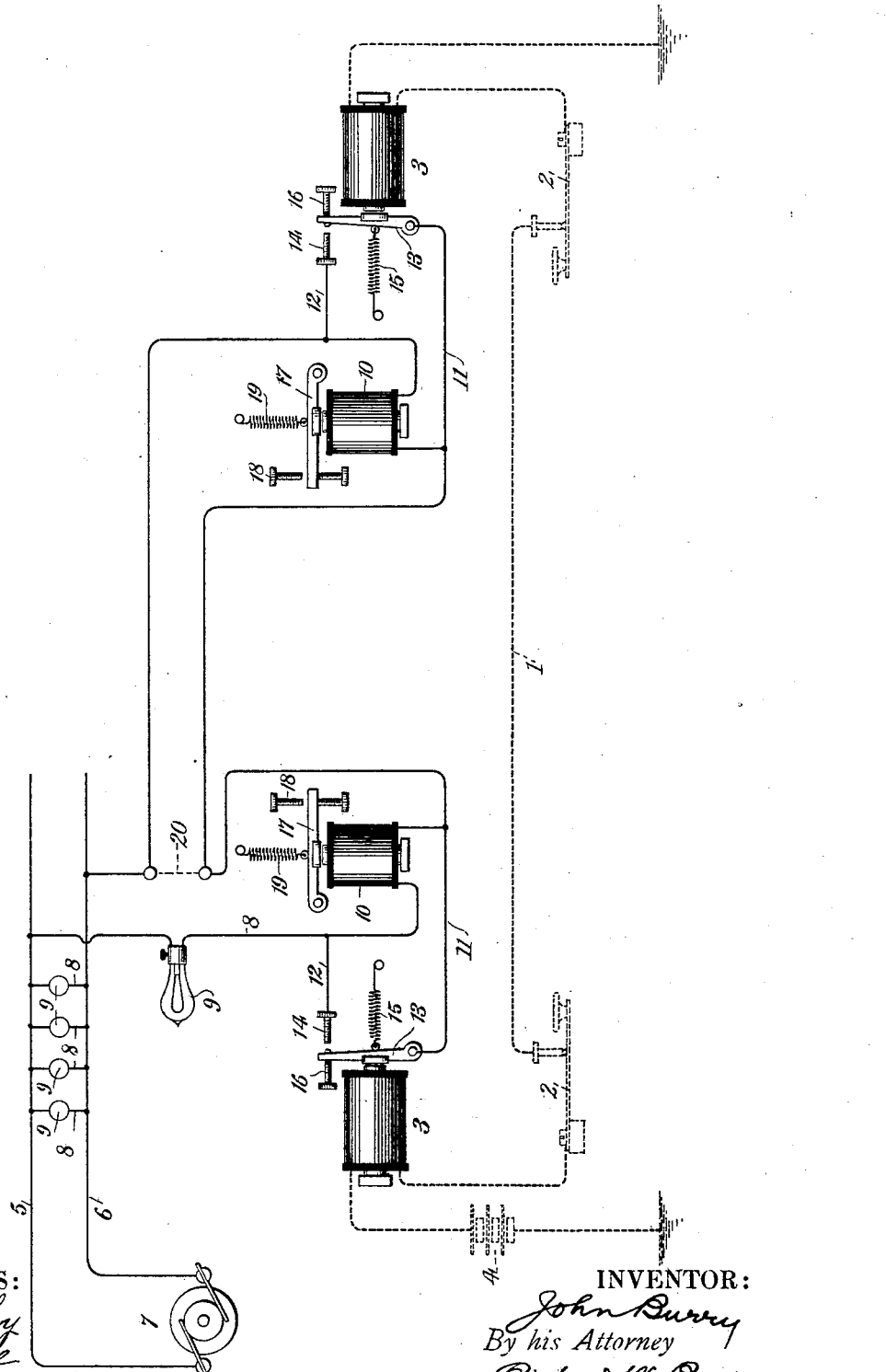
WITNESSES:
C. E. Ashley
Frank Ryall
INVENTOR:
John Burry
By his Attorney
Richard W. Barkley

UNITED STATES PATENT OFFICE.

JOHN BURRY, OF FORT LEE, NEW JERSEY.

TELEGRAPH APPARATUS.

SPECIFICATION forming part of Letters Patent No. 677,535, dated July 2, 1901.

Application filed November 20, 1899. Serial No. 737,593. (No model.)

*To all whom it may concern:*

Be it known that I, JOHN BURRY, a citizen of the United States, and a resident of Fort Lee, in the county of Bergen and State of New Jersey, have invented a certain new and useful Improvement in Telegraph Apparatus, of which the following is a specification.

This invention relates to local apparatus and circuits for telegraph-stations, having for its principal object the substitution of current from electric-lighting plants or mains for that usually derived from blue-stone or other form of batteries, though in some of its phases the invention is not limited to such substitution.

The offices of many business houses — as brokers, commission men, and others — have telegraph instruments therein, which are connected with the main or other office of a telegraph company, and the local circuits thereof are commonly furnished with blue-stone batteries. These batteries are objectionable for many reasons and are only tolerated because no economical and efficient substitute has been conveniently obtainable. In many cases the buildings in which these offices are situated are lighted by incandescent electric lights, which derive current from a plant in the building or from the mains of some company.

As above stated, the primary object of the present invention is to dispense with the local batteries and to substitute therefor current derived from the electric-lighting circuit.

Another object is to include an incandescent electric light in the local circuit or bridge between the mains of the electric-lighting circuit, so that when the light is turned off the sounder (or other receiver worked by a local circuit) will also be cut out. As the telegraph instruments are usually placed in some corner which requires to be lighted, the inclusion of the sounder in the lamp-circuit does not add appreciably to the cost of maintaining the local station.

To these ends the invention consists of features of construction and combinations of devices hereinafter described, and more particularly pointed out in the appended claims.

The preferred form of the invention is illustrated in the accompanying drawing, forming part of this specification, in which the reference-numeral 1 indicates a main-line circuit having a number of circuit-controllers or keys 2 and relays 3 therein and also any suitable source of electric energy, as battery 4.

5 6 are electric-light mains, as the positive or the negative and the neutral, and 7 indicates a dynamo. 8 indicates bridges between said mains 5 6, in which incandesent electric lights 9 are included. In carrying the present invention into effect in such case the coils of the electromagnet 10 of the sounder are also included in a bridge 8, and a shunt for the said electromagnet is formed by wires 11 12, which respectively connect the armature 13 of the relay and its back stop 14 with the bridge 8 at opposite sides of the coils of the magnet 10, as shown. The armature 13 is held against the stop 14 by a spring 15 whenever the current in the line is broken and is drawn over against the front stop 16 whenever the line-circuit is made.

By preference the light 9 is of sixteen-candle power, and the resistance of the electromagnet 10 is one or two ohms, while the resistance through the relay-armature and shunt is small as compared with the resistance of the magnet 10. The tension of the current in the bridges 8 is commonly one hundred and fifteen volts. I do not of course limit myself to the above-named tensions and resistances. They are merely given as an actual example or application of the invention.

The operation of the invention is as follows, reference being had to the drawing: Upon opening the line-circuit the springs 15 draw their respective relay-armatures over against the back stops 14, thus establishing the shunts of the magnets 10 and diverting the greater part of the current from said magnets and so decreasing the strength thereof as to cause them to release their armature-levers 17, which are thereupon drawn up against the usual back stops 18 by the springs 19. Upon closing the line-circuit the magnets of the relays 3 are energized and their armature-levers 13 are drawn over against the front stops 16, thus opening the shunts and diverting the whole current in the corresponding bridges through the coils of the corresponding magnets 10 at each receiving-station. This increase in the strength of the magnets 10 causes them to draw their armatures to themselves against the force of the springs 19.

It will be noted that the shunt is arranged to cause the drawing down of the sounder-levers whenever the line-circuit is made, this being the common method of working sounders; but sometimes an operator works his sounder from the front stop of his relay, thus inverting the operation. It would not be a departure from the present invention to do the same with the relays shown.

The drawing shows a case where a plurality of sounders are connected in series with the same lamp; but the invention is not limited to the use of a lamp, nor to the use of a lamp in series with a number of sounders, for I may use one sounder in a bridge 8, as indicated by dotted line 20, with or without a lamp 9, and a number of sounders may be otherwise connected with the mains or bridges.

Among the advantages of the present invention the following may be named: the avoidance of the use of a blue-stone or other objectionable battery, the use of the same current for both lighting and for operating a sounder or sounders, the prevention of sparking at the contacts of the relay-armature through the use of a non-inductive resistance in the local circuit or bridge, the reduction of the excursions of the relay-armatures, and increased activity or liveliness of the sounder.

What I claim as new, and desire to secure by Letters Patent of the United States, is—

1. In telegraphy, the combination of a main line, a relay therein, a receiver having an electromagnet, a local circuit consisting of a bridge in an electric-light circuit and in which bridge the coils of said electromagnet are continuously included, and a shunt for said magnet controlled by the armature of said relay, substantially as described.

2. In telegraphy, the combination of a main line, a relay therein, a receiver having an electromagnet, electric-light mains, a lamp-socket, a bridge between said mains and in which said socket and said electromagnet are included in series an incandescent lamp for said socket, and a shunt for said magnet controlled by the armature of said relay, substantially as described.

3. In telegraphy, the combination of a number of line-relays, and electromagnets of an equal number of receiving instruments, with a single local circuit comprising a single bridge in an electric-light circuit in which bridge the coils of said magnets are continuously included, and an independent shunt for each of said electromagnets in which the corresponding relay-armature is included, substantially as described.

4. In a telegraph system, the combination of a number of line-relays, and electromagnets of an equal number of receiving instruments, with a local circuit comprising a single bridge in an electric-light circuit in which bridge the coils of said electromagnets are continuously included, and an independent shunt for each of said electromagnets in which the corresponding relay-armature and its back stop are included, substantially as described.

5. In a telegraph system, the combination of a number of line-relays, and electromagnets of an equal number of receiving instruments, with a local circuit comprising a single bridge in an electric-light circuit in which a lamp-socket an incandescent lamp and the coils of said electromagnets are continuously included, and an independent shunt for each of said electromagnets in which the corresponding relay-armature is included, substantially as described.

6. In a telegraph system, the combination of a number of line-relays, and electromagnets of an equal number of receiving instruments, with a local circuit comprising a single bridge in an electric-light circuit in which a lamp-socket an incandescent lamp and the coils of said electromagnets are continuously included in series, and an independent make-and-break shunt for each of said electromagnets in which the corresponding relay-armature and its back stop are included, substantially as described.

Signed at New York, in the county of New York and State of New York, this 4th day of November, A. D. 1899.

JOHN BURRY.

Witnesses:
R. W. BARKLEY,
FRANK RYALL.